W. E. BABBITT.
WHEEL.
APPLICATION FILED DEC. 5, 1911.
1,076,735.
Patented Oct. 28, 1913.
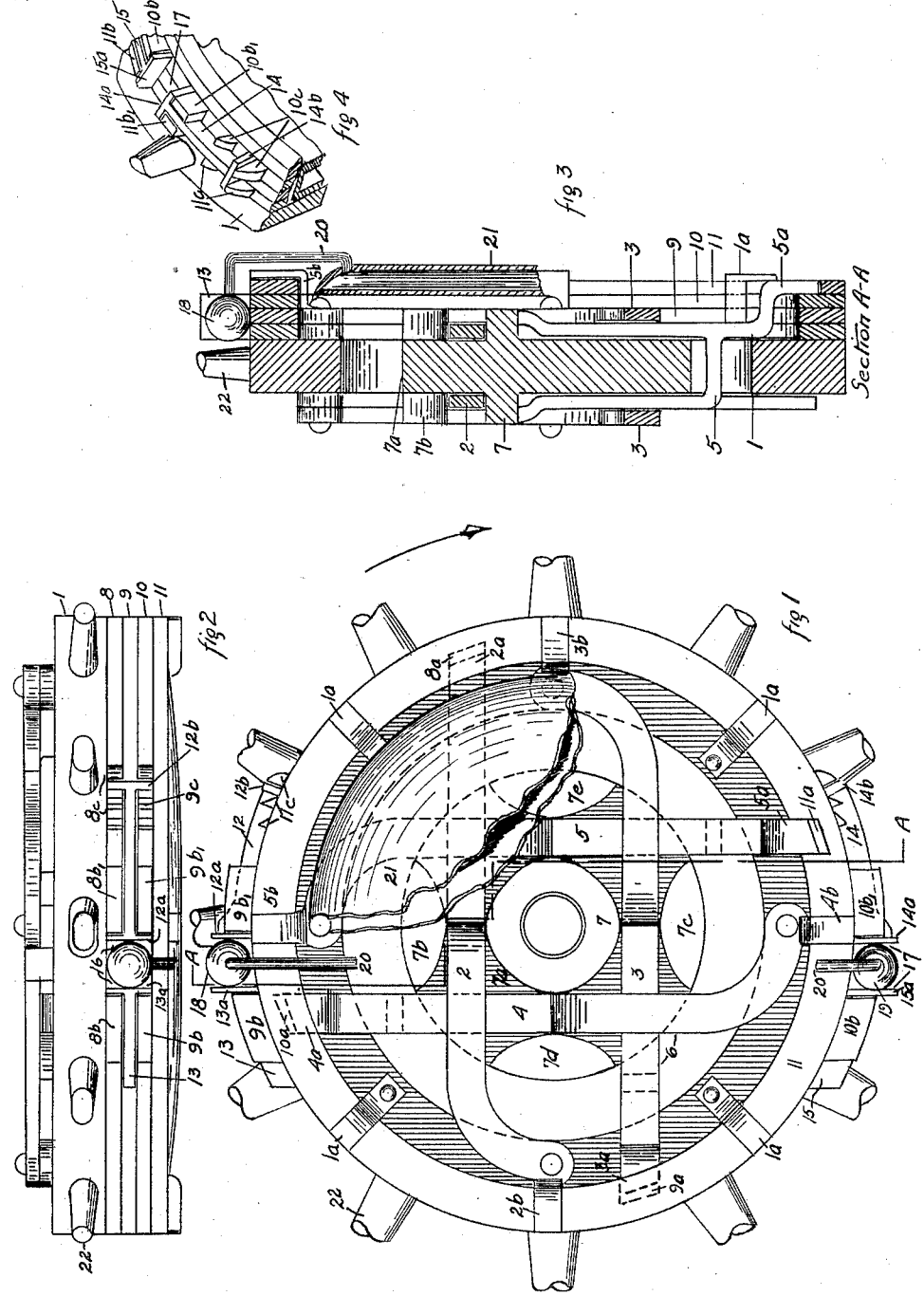
Witnesses:
George G. Clark.
Ethel W. Fayon
W. Edmands Babbitt Inventor
per Ralph W. ──
Attorney

UNITED STATES PATENT OFFICE.

WALKER EDMANDS BABBITT, OF WORCESTER, MASSACHUSETTS.

WHEEL.

1,076,735.  Specification of Letters Patent.  Patented Oct. 28, 1913.

Application filed December 5, 1911. Serial No. 664,040.

*To all whom it may concern:*

Be it known that I, WALKER EDMANDS BABBITT, a citizen of the United States, and resident of Worcester, in the county of Worcester and State of Massachusetts, have invented certain new and useful Improvements in Wheels, of which the following is a specification.

This invention relates to wheels for motor vehicles and its object is to provide a wheel of sufficient resiliency without the employment of pneumatic tires.

The invention is illustrated by the accompanying drawings in which:—

Figure 1 is a plan view of the outer side of the hub with the air tank partly broken away. Fig. 2 is a plan view of the top of the hub. Fig. 3 is a sectional view on the line A A Fig. 1 with the air tank partly broken away. Fig. 4 is a detailed view in perspective showing the arrangement of the sliding members so called.

The wheel is furnished with the ring 1, on which are fulcrumed the forked levers 2, 3, 4, 5, furnished with free outer ends $2^a$, $3^a$, $4^a$, $5^a$ and furnished on their fulcrumed ends with guiding lugs $2^b$, $3^b$, $4^b$, $5^b$. These levers form a frame or support 6 for the hub 7 adapted to engage radially the inner side of said forked levers and furnished radially with a reduced central extension $7^a$ adapted to engage laterally the under side of said forked levers; said extension $7^a$ being furnished laterally with lugs $7^b$, $7^c$, $7^d$, $7^e$, adapted to engage radially the outer side of said forked levers. The annuli 8, 9, 10, 11 are furnished with slots $8^a$, $9^a$, $10^a$, $11^a$, projections $8^b$, $8^{b\prime}$, $9^b$, $9^{b\prime}$, $10^b$, $10^{b\prime}$, $11^b$, $11^{b\prime}$ and ratchet teeth $8^c$, $9^c$, $10^c$, $11^c$ and are rotatably mounted on the outer side of and concentrically with ring 1, being held radially and laterally thereon by said guiding lugs $2^b$, $3^b$, $4^b$, $5^b$; the said free outer ends of said forked levers engaging said slots and thereby limiting and controlling the rotatability of said annuli. Sliding members 12, 13, 14 and 15 are disposed circumferentially and oppositely between said projections and said ratchet teeth and are furnished forwardly and oppositely with flanges $12^a$, $13^a$, $14^a$, $15^a$ adapted to engage the forward ends of said projections and be actuated forwardly thereby, and are also furnished rearwardly with flanges $12^b$, $14^b$ adapted to engage the forward faces of said ratchet teeth and thereby lock said sliding members in their forward position when their forward flanges are in contact. These sliding members with the annuli form two expansible chambers 16, 17 with circumferentially moving walls adapted to approach or recede from each other, thereby making the chamber smaller or larger. Within the chambers 16 and 17 are disposed the rubber bulbs 18, 19, which are connected by tubes 20 with the air supply tank 21 mounted on the ring. Spokes 22 are adapted to connect the inner ring with an outer rim not shown.

The operation of the wheel is as follows: The wheel is assumed to rotate clockwise as indicated by the arrow Fig. 1. In Fig. 1 the wheel is shown in its normal operative position, but without any load, the hub 7, hub extension $7^a$ and lugs $7^b$, $7^c$, $7^d$, $7^e$ engaging the several forked levers fulcrumed on the ring and with their free ends engaging the slots in the annuli as described; the sliding members 12, 13, 14, 15 are in their extreme rearward position, the chambers then being of their largest dimensions; the rubber bulbs lie in the chambers uncompressed and connected by the tubes with the air tank. When a load is placed upon the hub, the latter will compress lever 3, while lug $7^b$ will compress lever 2 to the same extent, thereby rotating the annuli 8 and 10, advancing the sliding members 12 and 13 and compressing the bulb 18; as the wheel rotates, the load passes gradually from the forked levers 2 and 3 until, after a quarter revolution of the wheel, it rests upon levers 4 and 5; and during this passage of the load the bulb 18, being gradually relieved of pressure, tends to assume its normal shape, thereby actuating sliding members 12, 13 and annuli 8, 10 rearwardly and returning the forked levers 2 and 3 to their normal position; while the forked levers 4 and 5 being gradually depressed actuate the annuli 9 and 11 and compress the bulb 19 all as described; when the wheel has made a half revolution, the load has again gradually passed to the first named forked levers 2 and 3 and depressed them, but in the opposite direction to that of their original depression, and has again actuated the sliding members 12 and 13 forwardly, thereby again compressing bulb 18. In this manner the bulbs are alternately compressed and alternately react, thereby providing the desired resiliency. If for any reason a bulb should burst permitting the sliding walls of the bulb chamber to come together, the rear flange of the sliding members, 12 or 14, will be engaged by the forward face of the corresponding ratchet teeth, thereby locking the sliding members together; and when this occurs, the hub is locked in its normal central position in which it will remain. I have shown additional guiding lugs 1ª on ring 1 for the annuli. Fig. 4 shows the arrangement of sliding members 14 and 15, which is similar to that of sliding members 12 and 13.

It might be added that, should one of the bulbs, for example bulb 18, burst and the sliding members 12, 13 be locked together as described preventing further rotatability of the annuli 8, 10, then the annuli 9, 11 and the bulb 19 would continue to operate; and that, should both bulbs burst, then all the annuli would cease to rotate leaving the hub centrally disposed.

I claim:

1. A wheel of the character described comprising, in combination, a ring; a plurality of forked levers fulcrumed thereon and forming a frame; a hub disposed in said frame and furnished with a plurality of lugs, said hub and said lugs engaging said levers; a plurality of annuli rotatably mounted on said ring and engaged by said levers; a plurality of sliding members disposed on said annuli and forming expansible chambers thereon; means disposed on said annuli for locking said sliding members; bulbs disposed in said chambers; an air supply tank disposed on said ring; and tubes connecting said bulbs with said tank; substantially as described.

2. A wheel of the character described comprising, in combination, a ring; a plurality of levers fulcrumed thereon and forming a frame; a hub disposed in said frame and furnished with a plurality of lugs, said hub and said lugs engaging said levers; a plurality of annuli rotatably mounted on said ring and engaged by said levers; a plurality of sliding members disposed on said annuli and forming expansible chambers thereon; means disposed on said annuli for locking said sliding members; bulbs disposed in said chambers; an air supply tank disposed on said ring; and tubes connecting said bulbs with said tank; substantially as described.

3. A wheel of the character described comprising, in combination, a ring; a plurality of forked levers fulcrumed thereon and forming a frame; a hub disposed in said frame and engaging said levers; a plurality of annuli rotatably mounted on said ring and engaged by said levers; a plurality of sliding members disposed on said annuli and forming expansible chambers thereon; means disposed on said annuli for locking said sliding members; bulbs disposed in said chambers; an air supply tank disposed on said ring; and tubes connecting said bulbs with said tank; substantially as described.

4. A wheel of the character described comprising, in combination, a ring; a plurality of levers fulcrumed thereon and forming a frame; a hub disposed in said frame and engaging said levers; a plurality of annuli rotatably mounted on said ring and engaged by said levers; a plurality of sliding members disposed on said annuli and forming expansible chambers thereon; means disposed on said annuli for locking said sliding members; bulbs disposed in said chambers; an air supply tank disposed on said ring; and tubes connecting said bulbs with said tank; substantially as described.

5. A wheel of the character described comprising, in combination, a ring; a plurality of forked levers fulcrumed thereon and forming a frame; a hub disposed in said frame and furnished with a plurality of lugs, said hub and said lugs engaging said levers; a plurality of annuli rotatably mounted on said ring and engaged by said levers; a plurality of sliding members disposed on said annuli and forming expansible chambers thereon; means disposed on said annuli for locking said sliding members; bulbs disposed in said chambers; substantially as described.

6. A wheel of the character described comprising, in combination, a ring; a plurality of levers fulcrumed thereon and forming a frame; a hub disposed in said frame and furnished with a plurality of lugs, said hub and said lugs engaging said levers; a plurality of annuli rotatably mounted on said ring and engaged by said levers; a plurality of sliding members disposed on said annuli and forming expansible chambers thereon; means disposed on said annuli for locking said sliding members; bulbs disposed in said chambers; substantially as described.

7. A wheel of the character described comprising, in combination, a ring; a plurality of forked levers fulcrumed thereon and forming a frame; a hub disposed in said frame and engaging said levers; a plurality of annuli rotatably mounted on said ring and engaged by said levers; a plurality of sliding members disposed on said annuli and forming expansible chambers thereon; means disposed on said annuli for locking said sliding members; bulbs disposed in said chambers; substantially as described.

8. A wheel of the character described comprising, in combination, a ring; a plurality of levers fulcrumed thereon and forming a frame; a hub disposed in said frame and engaging said levers; a plurality of annuli rotatably mounted on said ring and engaged by said levers; a plurality of sliding members disposed on said annuli and forming expansible chambers thereon; means disposed on said annuli for locking said sliding members; bulbs disposed in said chambers; substantially as described.

9. A wheel of the character described comprising, in combination, a ring; a plurality of levers fulcrumed thereon and forming a frame; a hub disposed in said frame and engaging said levers; a plurality of annuli rotatably mounted on said ring and engaged by said levers; and a resilient body suitably disposed and adapted to be compressed by said annuli; substantially as described.

10. A wheel of the character described comprising, in combination, a ring; a plurality of levers fulcrumed thereon and forming a frame; a hub disposed in said frame and engaging said levers; a plurality of annuli rotatably mounted on said ring and engaged by said levers; a resilient body suitably disposed and adapted to be compressed by said annuli; and means for locking said annuli and preventing their rotation; substantially as described.

11. A wheel of the character described comprising, in combination, a ring; a plurality of levers fulcrumed thereon and forming a frame; a hub disposed in said frame and engaging said levers; a plurality of annuli rotatably mounted on said ring and engaged by said levers; and resilient means suitably disposed for controlling the rotatability of said annuli; substantially as described.

12. A wheel of the character described comprising, in combination, a ring; a plurality of levers fulcrumed thereon and forming a frame; a hub disposed in said frame and engaging said levers; a plurality of annuli rotatably mounted on said ring and engaged by said levers; resilient means suitably disposed for controlling the rotatability of said annuli; and means suitably disposed for locking said annuli and preventing their rotation; substantially as described.

13. A wheel of the character described comprising in combination a ring; a plurality of forked levers fulcrumed thereon and forming a frame; a hub disposed in said frame and furnished with a plurality of lugs; said hub and said lugs engaging said levers; the free outer ends of said levers engaging resiliently said ring.

14. A wheel of the character described comprising in combination a ring; a plurality of levers fulcrumed thereon and forming a frame; a hub disposed in said frame and furnished with a plurality of lugs; said hub and said lugs engaging said levers; the free outer ends of said levers engaging resiliently said ring.

In testimony whereof I have affixed my signature, in presence of two witnesses.

W. EDMANDS BABBITT.

Witnesses:
RALPH W. FOSTER,
FRANCIS H. BLACKWELL.

---

Copies of this patent may be obtained for five cents each, by addressing the "Commissioner of Patents, Washington, D. C."